(12) United States Patent
Inoue et al.

(10) Patent No.: US 7,347,081 B2
(45) Date of Patent: Mar. 25, 2008

(54) KNOCK DETECTING APPARATUS AND METHOD FOR INTERNAL COMBUSTION ENGINE

(75) Inventors: Masaomi Inoue, Kariya (JP); Yuichi Takemura, Anjo (JP); Satoshi Masuda, Kariya (JP); Kenji Kasashima, Aichi-ken (JP); Rihito Kaneko, Aichi-ken (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 0 days.

(21) Appl. No.: 11/106,546

(22) Filed: Apr. 15, 2005

(65) Prior Publication Data
US 2005/0241369 A1     Nov. 3, 2005

(30) Foreign Application Priority Data
Apr. 15, 2004     (JP)     ............................. 2004-119849

(51) Int. Cl.
G01L 23/22     (2006.01)
(52) U.S. Cl. ..................................... 73/35.09
(58) Field of Classification Search .... 73/35.01–35.13, 73/117.2, 117.3; 123/406.37, 406.38, 406.39, 123/406.4, 406.41
See application file for complete search history.

(56) References Cited

U.S. PATENT DOCUMENTS 4,289,102 A  *  9/1981  Katsumata et al. ..... 123/406.21
4,312,214 A  *  1/1982  Kramer et al. .............. 73/35.05
4,345,558 A  *  8/1982  Yamaguchi et al. ... 123/406.35
4,425,891 A  *  1/1984  Kashimura et al. .... 123/406.16

(Continued)

FOREIGN PATENT DOCUMENTS

CN         1310293 A       8/1995

(Continued)

OTHER PUBLICATIONS

European Search Report for Appln. No. 05008323.7-2213 issued Aug. 25, 2006.

(Continued)

*Primary Examiner*—Hezron Williams
*Assistant Examiner*—Tamiko Bellamy
(74) *Attorney, Agent, or Firm*—Kenyon & Kenyon LLP

(57) ABSTRACT

The signal levels of vibration waveform signals outputted by knock sensors are extracted at a filter processing section for each of a plurality of frequency bands. The mean value of the signal levels in the frequency bands at a point in time when variation of the signal levels in the frequency bands is minimum computed, and the mean value is detected as a background level. A knock characteristic parameter, which represents the characteristics of knock, is computed based on the extracted signal levels in the frequency bands. The knock characteristic parameter is compared with the background level to obtain a knock intensity. If the knock intensity is equal to or greater than a knock determination value, it is determined that knock that exceeds a permissible level is occurring. If the knock intensity is less than the knock determination value, it is determined that knock that exceeds the permissible level is not occurring. This configuration permits the background level of the output of the knock sensors to be accurately detected without being influenced by knock or noise.

14 Claims, 6 Drawing Sheets

U.S. PATENT DOCUMENTS

| | | | | |
|---|---|---|---|---|
| 4,508,079 | A | * | 4/1985 | Komurasaki et al. .. 123/406.33 |
| 4,558,674 | A | * | 12/1985 | Okado et al. .......... 123/406.37 |
| 5,121,729 | A | * | 6/1992 | Hashimoto et al. .... 123/406.16 |
| 5,190,011 | A | * | 3/1993 | Hashimoto et al. .... 123/406.38 |
| 5,460,031 | A | * | 10/1995 | Fujishita et al. ........... 73/35.03 |
| 5,598,822 | A | * | 2/1997 | Fujishita et al. ....... 123/406.38 |
| 6,234,146 | B1 | | 5/2001 | Tanaya et al. ......... 123/406.37 |
| 6,246,953 | B1 | | 6/2001 | Quinn et al. ................. 701/111 |
| 6,439,029 | B2 | | 8/2002 | Asano et al. .............. 73/35.08 |
| 6,591,660 | B1 | | 7/2003 | Franke et al. .............. 73/35.03 |
| 6,748,922 | B2 | * | 6/2004 | Uchida et al. ......... 123/406.38 |
| 6,947,829 | B2 | * | 9/2005 | Honda ........................ 701/111 |
| 2001/0011204 | A1 | | 8/2001 | Tomo et al. ................ 73/35.04 |
| 2004/0204814 | A1 | * | 10/2004 | Honda ........................ 701/111 |
| 2006/0129303 | A1 | * | 6/2006 | Sauler et al. ............... 701/111 |

FOREIGN PATENT DOCUMENTS

| | | |
|---|---|---|
| CN | 1322295 A | 11/2001 |
| JP | 6-41151 | 1/1989 |
| JP | 2002-47993 | 2/2002 |

OTHER PUBLICATIONS

Chinese Office Action, Appln. No. 2005100646096 issued Jan. 12, 2007.

* cited by examiner

KNOCK DETECTING APPARATUS AND METHOD FOR INTERNAL COMBUSTION ENGINE

BACKGROUND OF THE INVENTION

The present invention relates to a knock detecting apparatus for an internal combustion engine, which apparatus has a function for detecting the background level of output signals from a vibration waveform detection section that detects knocking vibration of the internal combustion engine. The present invention also relates to a knock detecting method.

Typically, for detecting knock of an internal combustion engine, knocking vibration of the cylinder block is detected, and the signal level in a knock frequency band from output signals of the knock sensor is extracted at a filter. Then, the signal level in the knock frequency band is compared with a knock determining level. Knock determination is thus performed. In this case, the knock determining level is set with reference to the background level of the output signals of the knock sensor. Therefore, the background level needs to be detected accurately.

The background level changes according to the operating state of the internal combustion engine. For example, in Japanese Examined Utility Model Publication No. 6-41151, output signals of a knock sensor are subject to smoothing process at every ignition during the operation of the internal combustion engine to obtain the background level. However, in a transient operating state in which the signal level of the knock sensor is abruptly changed, a response delay is caused in the obtained background level, which can lead to an erroneous detection of knock.

To deal with this drawback, Japanese Laid-Open Patent Publication No. 2002-47993 discloses a technique, in which, during a knock determination period set for the combustion stroke of each cylinder, a signal level in a frequency band that is different from the knock frequency band is extracted from an output signal of a knock sensor (hereinafter, the different band will be referred to as a background frequency band), and the background level is computed, accordingly.

Further, U.S. Pat. No. 6,246,953 discloses another technique, in which a background level is computed based on an output signal of a knock sensor during a period that is different from the knock determination period (hereinafter, the different period will be referred to as a background determination period).

However, when knock occurs, the signal level in the knock frequency band is significantly increased. Accordingly, the signal level in the background frequency band, which is different from the knock frequency band, is increased. Therefore, if the background level is detected based on the signal level in the background frequency band as in Japanese Laid-Open Patent Publication 2002-47993, the background level is detected to be greater than the actual value when knock occurs. Further, when noise is superimposed on the background frequency band, the background level is detected to be greater than the actual value.

Also, in recent years, to increase power, improve fuel economy, and reduce emission, more and more engines are equipped with a variable valve actuation mechanism such as a variable valve timing mechanism or with a system for varying fuel injection timing of in-cylinder fuel injection. In these internal combustion engines, a period in which contacting noise of intake and exhaust valves and actuation noise of the fuel injection valves are contained in output signals of the knock sensor is changed according to the control state of the engine. Therefore, it is becoming difficult to uniformly set a background determination period in which such noise is not produced. Thus, the method disclosed in U.S. Pat. No. 6,246,953 has a drawback shown below. That is, although depending on the control state of an internal combustion engine, contacting noise of intake and exhaust valves and actuation noise of the fuel injection valves are superimposed on output signals of a knock sensor in a background determination period (see FIG. 6). This causes the background level to be detected as a value greater than the actual value.

SUMMARY OF THE INVENTION

Accordingly, it is an objective of the present invention to provide a knock detecting apparatus and method for an internal combustion engine, which apparatus and method accurately detect a background level without being influenced by knock and noise, and improve the knock detection accuracy.

To achieve the foregoing and other objectives, a knock detecting apparatus for an internal combustion engine according to the present invention: uses a signal level extraction section to extract, for each of a plurality of frequency bands, a signal level of a vibration waveform signal outputted by a vibration waveform detection section that detects knocking vibration of the engine by; and uses a background level detection section to detect a background level based on the signal level in at least one of a plurality of frequency bands extracted at the signal level extraction section at a point in time when variation of the signal levels in the frequency bands is determined to be minimum or close to minimum.

If knock or noise occurs when signal levels in a plurality of frequency bands are extracted from output signals from the vibration waveform detection section, the knock or noise affects only signal levels in some of frequency bands by a great degree and does not significantly affect signal levels in the other frequency bands. Therefore, at a crank angle position where variation of signal levels in a plurality of frequency bands is minimum or close to minimum, it is determined that no knock or noise is occurring. At this crank angle position, if a background level is detected based on the signal level in at least one of the frequency bands is detected, the background level is accurately detected without being influenced by knock or noise.

There are various methods for performing knock determination by using the background level. A knock detecting apparatus, for example, may include a parameter computation section for computing knock characteristic parameter that represents the characteristics of knock based on signal levels in a plurality of frequency bands extracted at a signal level extraction section, and a knock intensity determination section for determining the intensity of knock by comparing the knock characteristic parameter with the background level. In this case, since the background level is accurately detected, the knock intensity is accurately computed if the background level is compared with the knock characteristic parameter. Needless to say, it may be configured that a knock determining level is set with reference to a background level, and knock determination is performed by comparing the knock determining level with the signal level in the knock frequency band.

The background level detection section may detect, as a background level, the mean value of the signal levels in a plurality of frequency bands extracted at a signal level extraction section at a point in time when variation of the signal levels in the frequency bands is determined to be minimum or close to minimum. Also, the background level detection section may detect, as a background level, the minimum signal level among the signal levels in the plurality of frequency bands. Alternatively, the background level detection section may detect, as the background level, a specific one among the signal levels in the plurality of frequency bands. It is preferable that the specific frequency band be different from the frequency bands that contain the resonance frequency of knock. This reliably eliminates the influence of knock to the background level.

Further, it is preferable that a background level be detected during a predetermined period set for each combustion stroke of each cylinder of the engine. This configuration permits a background level to be detected in each combustion stroke of each cylinder without being influenced by the history of the past background levels. Thus, even during a transient operating state, a background level is accurately detected without a response delay.

The vibration waveform detection section may be a knock sensor that detects vibration of the cylinder block of the engine, an in-cylinder pressure sensor that detects the pressure in a cylinder of the engine, an ion current detection section that detects ion current produced in a cylinder of the engine, or a rotation fluctuation detection section that detects rotation fluctuation of the engine. In any of these cases, a vibration waveform signal corresponding to knocking vibration of the engine is outputted.

Further, the present invention provides a knock detecting method for an internal combustion engine. The knock detecting-method includes: outputting a vibration waveform signal corresponding to knocking vibration of the engine; extracting the signal level of the outputted vibration waveform signal for each of a plurality of frequency bands; and detecting a background level based on the extracted signal level in at least one of the frequency bands at a point in time when variation of the signal levels in the frequency bands is determined to be minimum or close to minimum.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
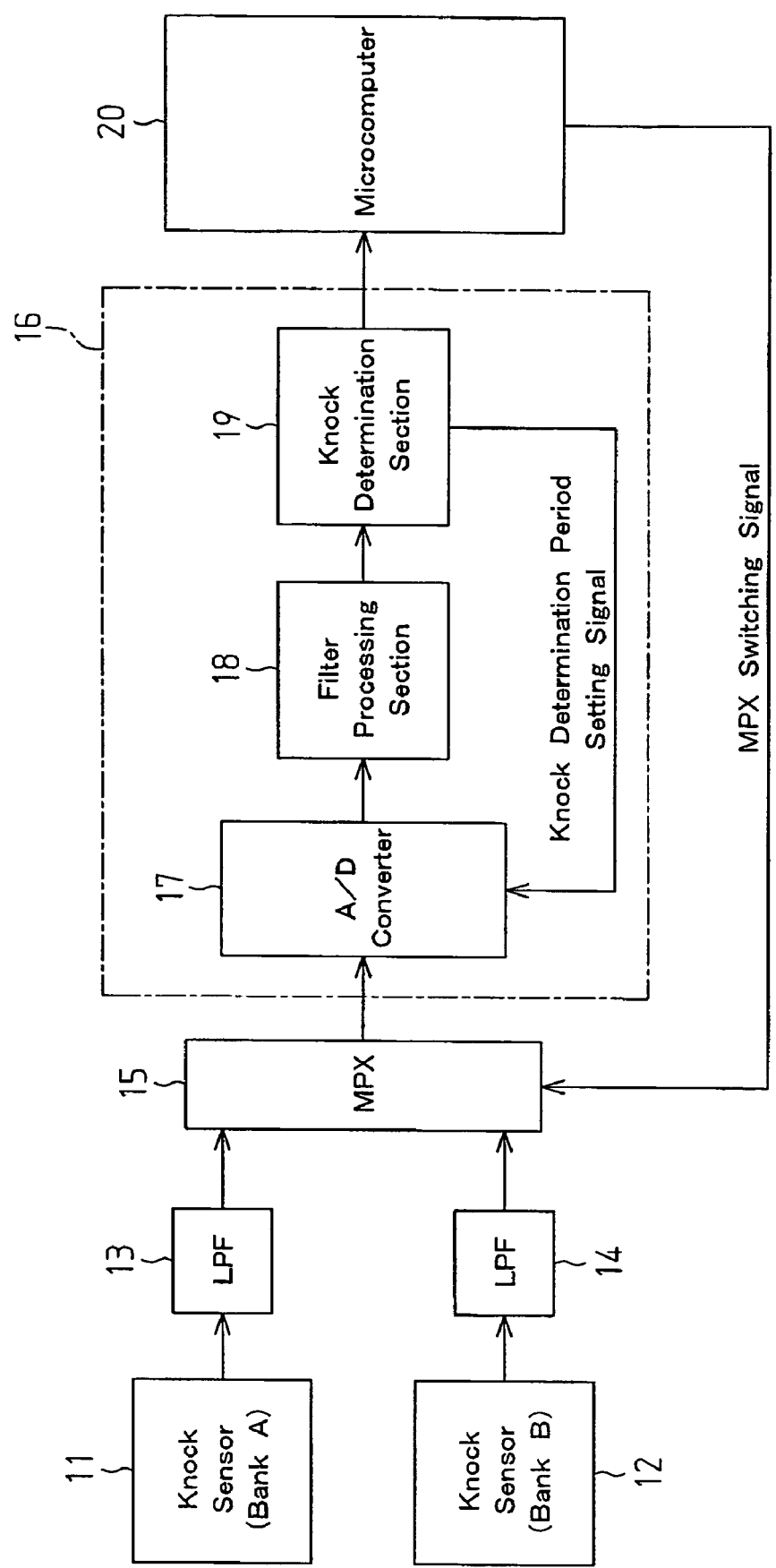
FIG. 1 is a block diagram illustrating the system of a knock detecting apparatus according to one embodiment of the present invention.

One embodiment according to the present invention will now be described. In this embodiment, the present embodiment is applied to a V-type eight-cylinder engine. The system configuration of an entire knock detecting apparatus will be described first. The V-type eight-cylinder engine (internal combustion engine) has cylinder blocks of two banks A, B. The cylinder blocks are provided with knock sensors (vibration waveform detection means or vibration waveform detection sections) 11, 12, respectively. The knock sensors 11, 12 detect vibrations of cylinder blocks. Vibration waveform signals outputted by the knock sensor 11, 12 are each sent to a multiplexer (MPX) 15 through low-pass filters (LPF) 13, 14, which attenuate high frequency components of the signals. The MPX 15 selects a vibration waveform signal of one of the knock sensors 11, 12 that corresponds to one of the banks A and B that includes a cylinder where ignition is taking place and sends the signal to a knock determination circuit 16.

The knock determination circuit 16 includes an A/D converter 17 for converting vibration waveform signals from the MPX 15 into digital values, a filter processing section 18 (signal level extraction means or a signal level extraction section) for extracting the signal levels of the output signals of the A/D converter 17 for each of a plurality of frequency bands (in this embodiment, four frequency bands F1 to F4), and a knock determination section 19 for performing knock determination based on the signal level in the frequency bands extracted at the filter processing section 18. The determination result of the knock determination section 19 is sent to a microcomputer 20 for controlling the engine.

The microcomputer 20 sends a knock determination period setting signal for setting a knock determination period (for example, a period corresponding to ATDC10° CA to 60° CA) for each combustion stroke of each cylinder to the A/D converter 17, and converts the vibration waveform signal from analog to digital within the knock determination period, thereby extracting the signal levels in the plurality frequency bands by the filter processing section 18. The microcomputer 20 controls the ignition timing based on the determination result of the knock determination section 19 so that the ignition timing is close to the knock limit, thereby increasing the engine power and improving the fuel economy.

Figure 6:
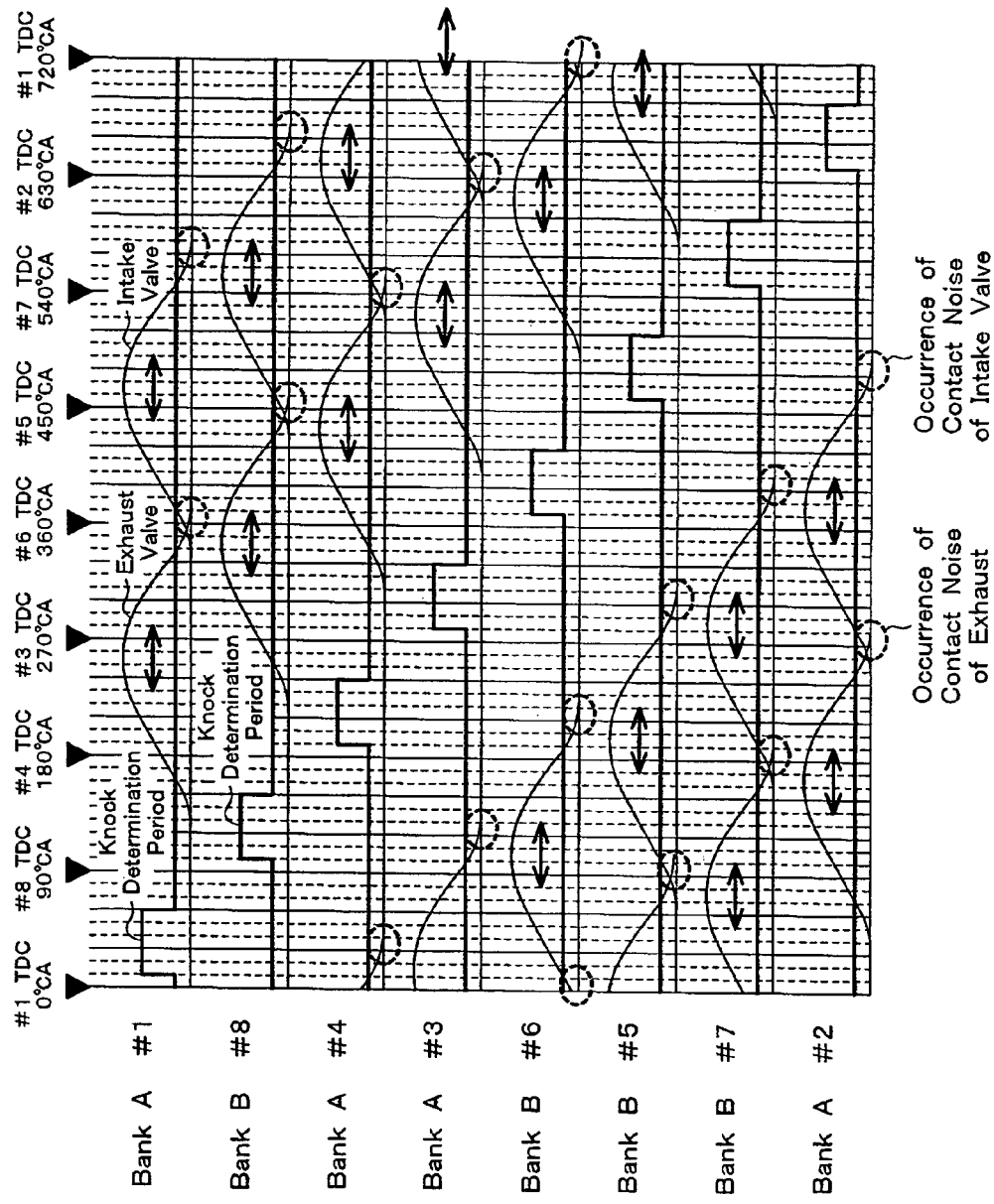
FIG. 6 is a time chart explaining the relationship between the order of ignition in a V-type eight cylinder engine, the opening and closing timing of intake and exhaust valves, and a knock determination period.

FIG. 6 is a time chart explaining the relationship between the order of ignition in a V-type eight-cylinder engine of the present embodiment, the opening and closing timing of intake and exhaust valves, and a knock determination period. The V-type eight-cylinder engine has the two banks A and B. In the bank A, half the cylinders, or cylinders #1 to #4, are arranged linearly. In the other back B, the remaining cylinders, or cylinders #5 to #8 are arranged linearly. The order of ignition is #1 (bank A)→#8 (bank B)→#4 (bank A)→#3 (bank A)→#6 (bank B)→#5 (bank B)→#7 (bank B)→#2 (bank A). When ignition is taking place in a cylinder in the bank A, the MPX 15 sends the vibration waveform signal from the knock sensor 11 of the bank A to the knock determination circuit 16. When ignition is taking place in a cylinder in the bank B, the MPX 15 sends the vibration waveform signal from the knock sensor 12 of the bank B to the knock determination circuit 16.

For example, in the example of FIG. 6, the knock determination period of the cylinder #1 of the back A, in which combustion takes place, can overlap the contacting noise of the intake valve of the cylinder #4 in the back A. Also, the knock determination period of the cylinder #8 of the bank B, in which combustion takes place next, can overlap the contacting noise of the intake valve of the cylinder #5 of the bank B. If a knock determination period coincides with contacting noise of a valve, conventional knock detecting methods detects the background level to be greater than the actual level due to the contacting noise of the valve.

To eliminate such drawbacks, the knock determination section 19 executes routines shown in FIGS. 2 and 3, which will be described below. That is, the knock determination section 19 functions as background level detection means (or background level detection section). Specifically, when variation of the signal levels in a plurality of frequency bands extracted at the filter processing section 18 is determined to be minimum or close to minimum (specifically, the difference between the maximum signal level and the minimum signal level of the signal levels in the plurality of frequency bands), the knock determination section 19 detects the background level based on the signal level in at least one of the plurality of frequency bands. Also, the knock determination section 19 functions as parameter computation means (or a parameter computation section) that computes a knock characteristic parameter that represents the characteristics of knock based on the signal levels in a plurality of frequency bands. The knock determination section 19 further functions as knock intensity determining means (or a knock intensity determining section) that determines the knock intensity by comparing the characteristic parameter and the background level. Hereafter, the functions of the knock determination section 19 will be described.

Figure 4:
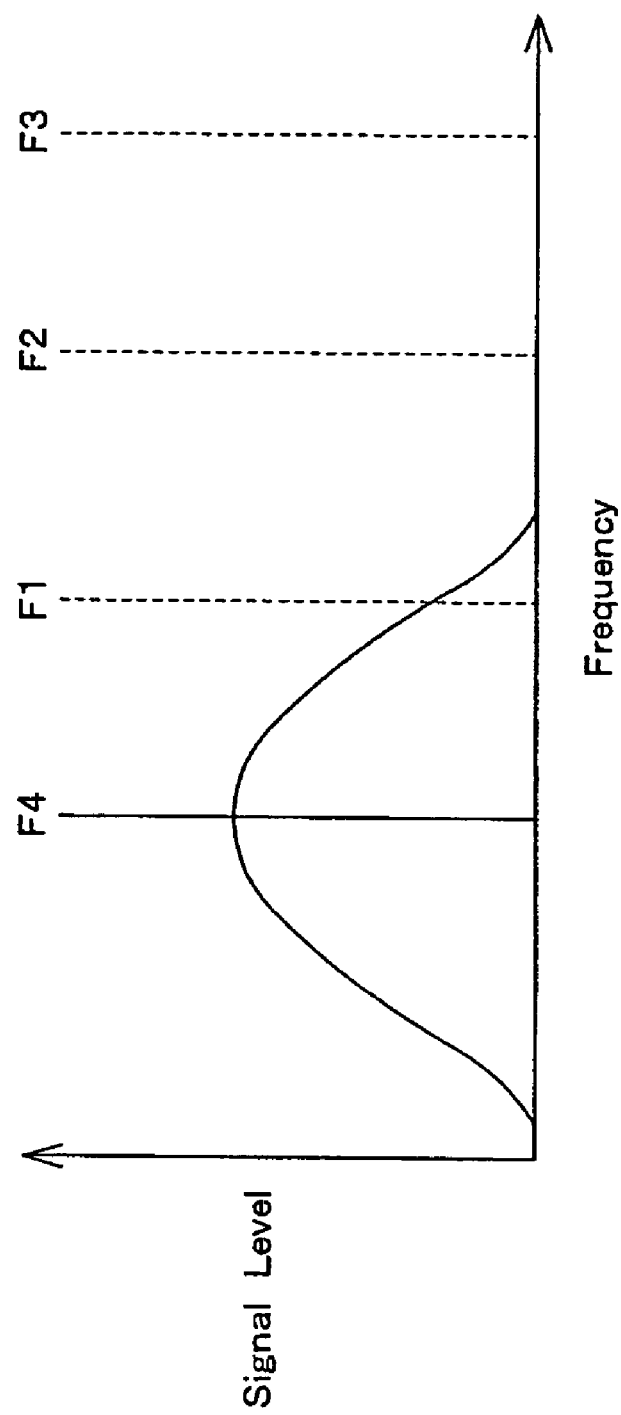
FIG. 4 is a graph showing filtering process for extracting signal levels in four frequency bands F1 to F4 from a vibration waveform signal outputted by a knock sensor.

A method for detecting a background level will be first described. The frequency band of the vibration waveform signal that is filtered by the LPFs (low-pass filters) 13, 14 is divided into frequency bands F1 to F4 (see FIG. 4). The frequency bands F1 to F4 are preferably determined in consideration of the resonance frequency when knock occurs. For example, three frequency bands F1 to F3 are preferably determined to contain resonant frequencies of orders 1, 1.5, and 2, respectively. The other frequency band F4 is preferably set to be sufficiently away from the resonant frequencies (for example, a frequency band less than the half of the resonance frequency of order 1).

Figure 5:
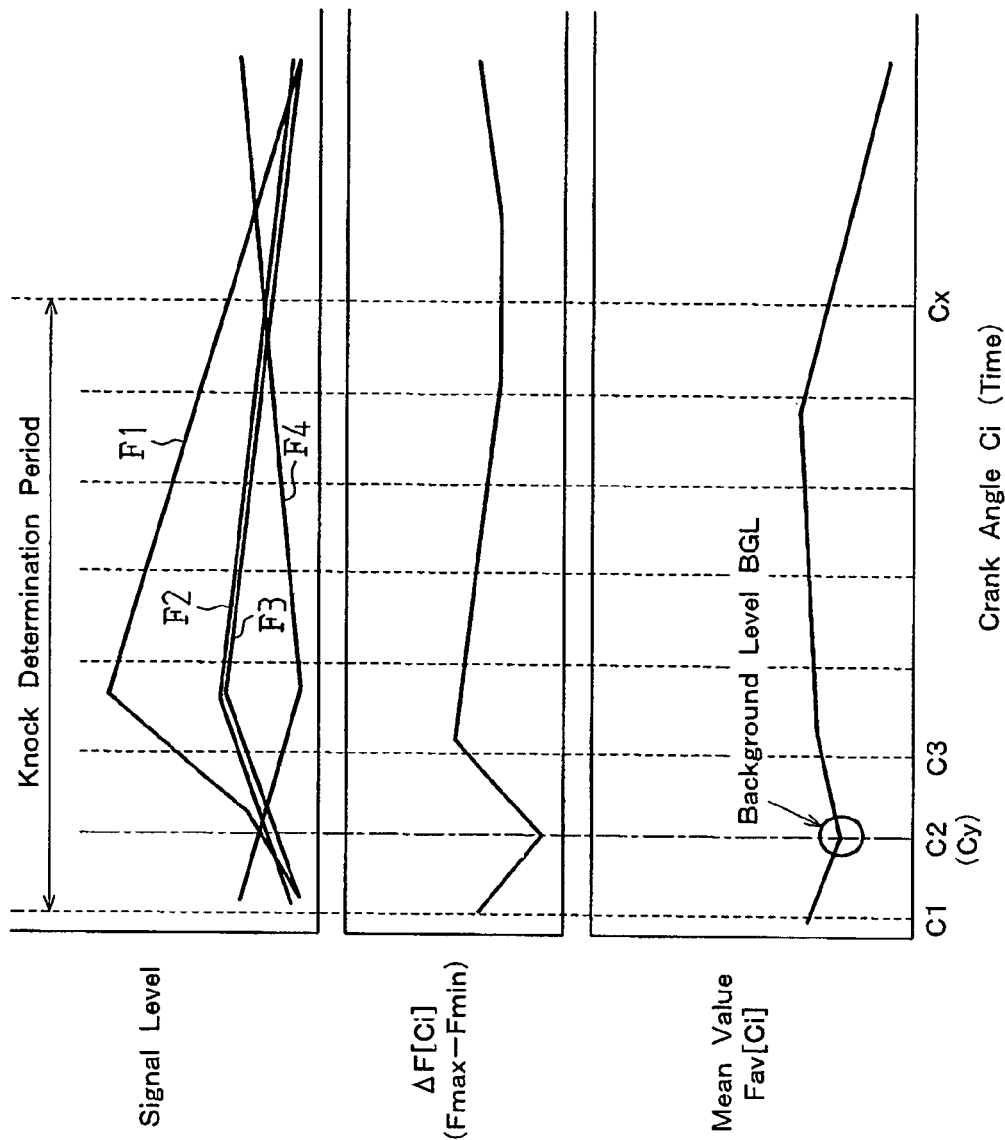
FIG. 5 is a time chart showing the behavior of the signal levels in the four frequency bands F1 to F4, the behavior of the difference $\Delta F[Ci]$ (Fmax−Fmin) between the maximum signal level Fmax and the minimum signal level Fmin, and the behavior of the mean value Fav[Ci] of the signal levels in the four frequency bands F1 to F4.

During the operation of the engine, the signal level is extracted at a predetermined sampling interval in each of the frequency bands F1 to F4 in a knock determination period set for each combustion stroke of each cylinder (for example, a period corresponding to ATDC10° CA to 60° CA), and the behaviors of the signal levels in the frequency bands F1 to F4 are monitored as shown in FIG. 5. A crank angle Cy (C2 in the example of FIG. 5) at which the difference ΔF[Ci] between the maximum signal level Fmax and the minimum signal level Fmin in the four frequency bands F1 to F4 is determined to be minimum or close to minimum is detected. Then, based on the signal levels in the frequency bands F1 to F4 at the crank angle Cy, a background level BGL is computed by any of the following methods.

[First Method for Computing Background Level]

The crank angle Cy, at which the difference ΔF[Ci] between the maximum signal level Fmax and the minimum signal level Fmin in the four frequency bands F1 to F4 is determined to be minimum, is detected. Then, the mean value Fav[Cy] of the signal levels in the frequency bands F1 to F4 at the crank angle Cy is computed. The mean value Fav[Cy] is set as the background level BGL.

$BGL=Fav[Cy]=(F1+F2+F3+F4)/4$

[Second Method for Computing Background Level]

The crank angle Cy, at which the difference ΔF[Ci] between the maximum signal level Fmax and the minimum signal level Fmin in the four frequency bands F1 to F4 is determined to be minimum, is detected. The minimum signal level Fmin of the signal levels in the frequency bands F1 to F4 at the crank angle Cy is set as the background level BGL.

$BGL=Fmin$

[Third Method for Computing Background Level]

The crank angle Cy, at which the difference ΔF[Ci] between the maximum signal level Fmax and the minimum signal level Fmin in the four frequency bands F1 to F4 is determined to be minimum, is detected. A specific one among the signal levels in the frequency bands F1 to F4 at the crank angle Cy is set as the background level BGL. In this case, the specific frequency band is preferably different from frequency bands that include resonant frequencies of knock. In this embodiment, the signal level in the frequency band F4, which is sufficiently away from the resonant frequencies, is set as the background level BGL.

$BGL=F4$

The background level BGL is computed by any of the above methods. Further, the knock characteristic parameter that represents the characteristics of knock is computed based on the signal levels in the four frequency bands F1 to F4. The knock characteristic parameter is computed, for example, in the following manner. For each of the frequency bands F1 to F4, the peak value of the signal waveform is multiplied by a waveform correlation coefficient. Then, an added up value of the multiplied value (peak value×waveform correlation coefficient) is set as the knock characteristic parameter. The knock characteristic parameter is divided by the background level BGL, and the resultant is set as the knock intensity.

Knock Characteristic parameter=Σ(Peak Value× Waveform Correlation Coefficient)

Knock Intensity=Knock Characteristic parameter/ BGL

The waveform correlation coefficient is a value that quantitatively represents the correlation between the signal waveform in each of the frequency bands F1 to F4 and a model knock waveform (ideal knock waveform). For example, the ratio of the area of the signal waveform in each of the frequency bands F1 to F4 in the knock determination period to the area of the model knock waveform is computed, and the computed ratio is set as the waveform correlation coefficient.

Waveform Correlation Coefficient=Signal Waveform Area/Model Knock Waveform Area

After the knock intensity is computed, the knock intensity is compared with a knock determination value. If the knock intensity is equal to or greater than the knock determination value, it is determined that knock that exceeds a permissible level is occurring. If the knock intensity is less than the knock determination value, it is determined that knock that exceeds the permissible level is not occurring.

Figure 2:
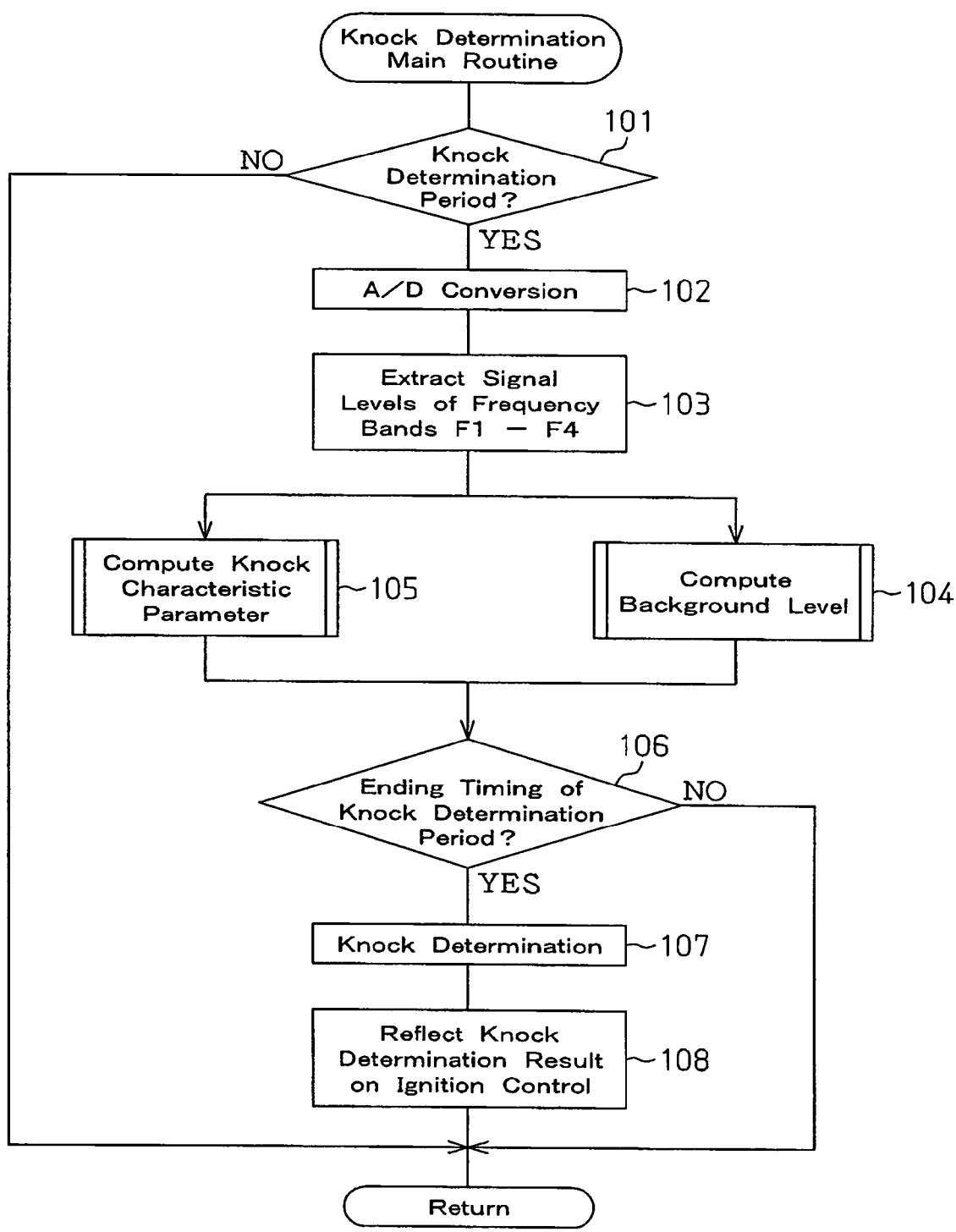
FIG. 2 is a flowchart showing a main routine of knock detection.
Figure 3:
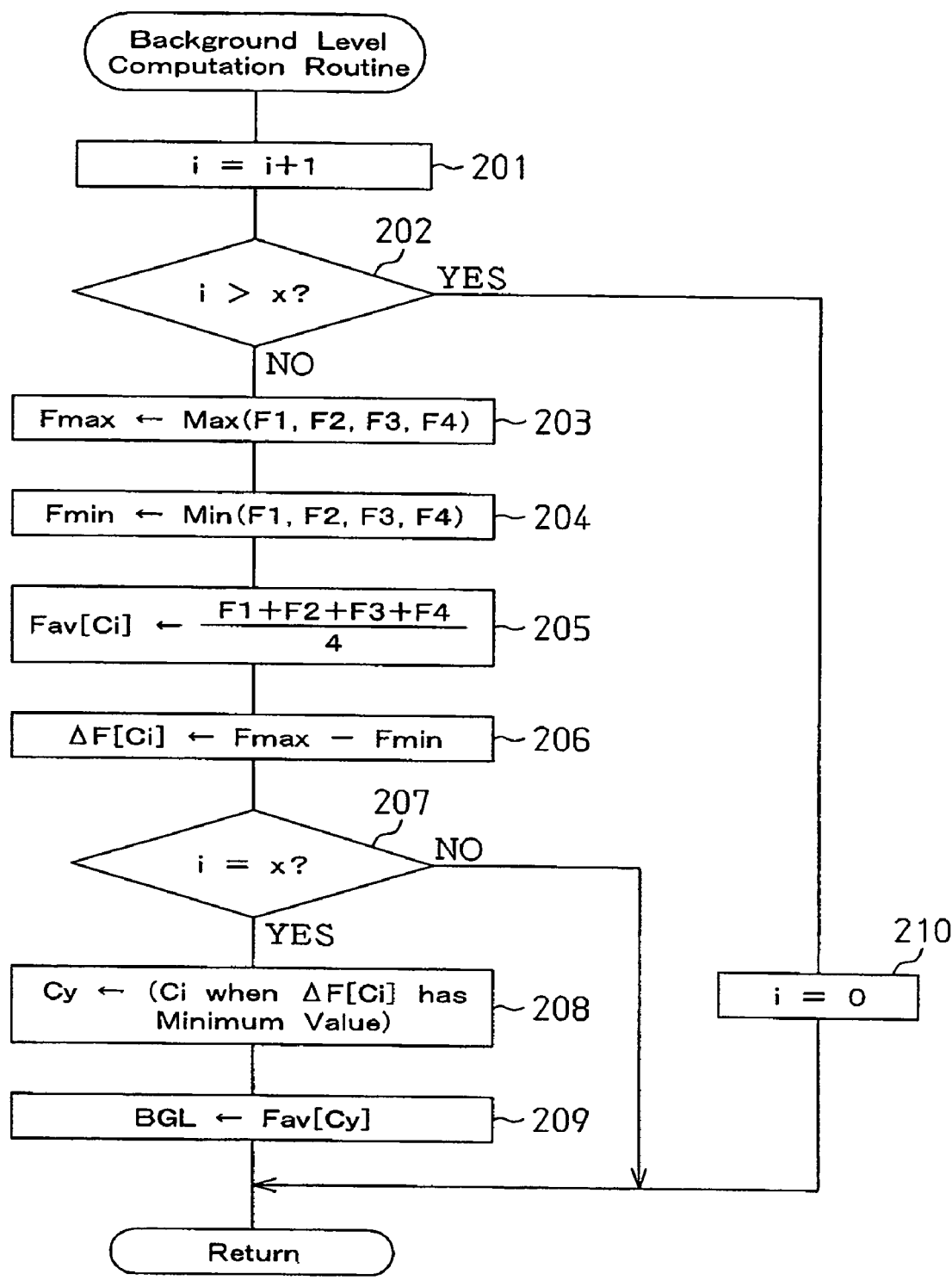
FIG. 3 is a flowchart showing a routine for computing a background level.

The knock determination process thus described is executed in the routines shown in FIGS. 2 and 3. The processes of each routine will now be described.

A main routine of knock determination shown in FIG. 2 is started at the sampling cycle of the output signals (vibration waveform signals) of the knock sensors 11, 12. When this routine is started, the knock determination circuit 16 determines whether it is now the knock determination period (for example, a period corresponding to ATDC10° CA to 60° CA), which is set for each combustion stroke of each cylinder. If it is not the knock determination period now, the knock determination circuit 16 ends the current routine without executing the subsequent process.

On the other hand, if it is now the knock determination period, the knock determination circuit 16 proceeds to step 102, and converts the vibration waveform signal from analog to digital. Then, the knock determination circuit 16 proceeds to step 103. At step 103, the knock determination circuit 16 extracts the signal levels in the four frequency bands F1 to F4. Thereafter, the knock determination circuit 16 executes a background level computation routine, which will be discussed below with reference to FIG. 3, at step 104, thereby performing a computation process for computing the background level BGL. The knock determination circuit 16 also executes a knock characteristic parameter computation routine (not shown) at step 105, thereby performing a computation process for computing knock characteristic parameter representing the characteristics of knock based on the signal levels in the four frequency bands F1 to F4.

Then, the knock determination circuit 16 proceeds to step 106, and determines whether it is now timing at which the knock determination period ends (whether the computations of the background level BGL and the knock characteristic parameters are completed). If it is not the ending timing of the knock determination period, the knock determination circuit 16 ends the current routine. If it is the ending timing of the knock determination period, the knock determination circuit 16 proceeds to step. 107. At step 107, the knock determination circuit 16 compares the knock intensity, which has been computed by dividing the knock characteristic parameter by the background level BGL, with the knock determination value. If the knock intensity is equal to or greater than the knock determination value, the knock determination circuit 16 determines that knock that exceeds a permissible level is occurring. If the knock intensity is less than the knock determination value, the knock determination circuit 16 determines that knock that exceeds the permissible level is not occurring. Subsequently, the knock determination circuit 16 proceeds to step 108, and sends the knock determination result to the microcomputer 20 so that the knock determination result is reflected on the ignition control. Then, the knock determination circuit 16 ends the current routine.

When the background level computation routine shown in FIG. 3 is started at step 104, the knock determination circuit 16 increments a counter i for distinguishing the crank angle Ci for sampling the vibration waveform signal during the knock determination period (the initial value of counter i is zero). At next step 202, the knock determination circuit 16 compares the value of the counter i with an end timing x of the knock determination period. If the value of the counter i exceeds the end timing x of the determination period, the knock determination circuit 16 proceeds to step 210, and resets the counter i to zero and ends the current routine.

On the other hand, if the value of the counter i does not exceed the end timing x of the knock determination period, the knock determination circuit 16 proceeds to step 203. At step 203, the knock determination circuit 16 compares the signal levels in the four frequency bands F1 to F4 at the current crank angle Ci with one another, thereby obtaining the maximum signal level Fmax. Thereafter, the knock determination circuit 16 proceeds to step 204. At step 204, the knock determination circuit 16 compares the signal levels in the four frequency bands F1 to F4 at the current crank angle Ci with one another, thereby obtaining the minimum signal level Fmin.

The knock determination circuit 16 then proceeds to step 205. At step 205, the knock determination circuit 16 computes the mean value Fav[Ci] of the signal levels in the four frequency bands F1 to F4 at the current crank angle Ci. Subsequently, the knock determination circuit 16 then proceeds to step 206. At step 206, the knock determination circuit 16 computes the difference $\Delta F[Ci]$ (Fmax−Fmin) between the maximum signal level Fmax and the minimum signal level Fmin in the four frequency bands F1 to F4 at the current crank angle Ci. In next step 207, the knock determination circuit 16 determines whether the value of the counter i has reached the end timing x of the knock determination period. If the value of the counter i has not reached the knock determination period, the knock determination circuit 16 ends the current routine.

Before long, when the value of the counter i reaches the end timing x of the knock determination period, the knock determination circuit 16 proceeds to step 208. At step 208, the knock determination circuit 16 sets, as the background level detection timing Cy, the crank angle Ci at which the difference $\Delta F[Ci]$ between the maximum signal level Fmax and the minimum signal level Fmin in the four frequency bands F1 to F4. At next step 209, the knock determination circuit 16 sets the mean value Fav[Cy] of the signal levels in the four frequency bands F1 to F4 at the background level detecting timing Cy as the background level BGL, and ends the current routine.

The above described present embodiment has a first characteristic in that the signal levels in the four frequency bands F1 to F4 are extracted from the vibration waveform signals outputted by the knock sensors 11, 12, and the background level BGL is computed based on the signal levels in the four frequency bands F1 to F4 when the variation (difference $\Delta F[Ci]$) among the signal levels in the four frequency bands is minimum. When the signal levels in the plurality of frequency bands F1 to F4 are extracted from the vibration waveform signal outputted by the knock sensors 11, 12, if knock or noise occurs, the knock or noise only affects only the signal levels in some of the frequency bands by a great degree and does not significantly affect the signal levels in the other frequency bands. Therefore, at a crank angle where the variation of the signal levels in the plurality of frequency bands is minimum (or close to minimum), it is determined that no knock or noise is occurring. If the background level BGL is detected based on the signal levels in the frequency bands F1 to F4 at this crank angle, the background level BGL is accurately computed without being influenced by knock or noise.

Further, in the present embodiment, the background level BGL is detected in the knock determination period set for each combustion stroke of each cylinder. Thus, the background level BGL is detected for each combustion stroke of each cylinder without being influenced at all by the history of the past values of the background level BGL. Even in a transient operating state, the background level BGL is accurately detected without a response delay.

Also, the present embodiment has a second characteristic, in which the knock characteristic parameter, which represents the characteristics of knock based on the signal levels in the frequency bands F1 to F4, and the knock characteristic parameter is compared to the background level BGL to determine the knock intensity. According to the present embodiment, since the background level BGL is accurately detected, the knock intensity is accurately computed if the background level BGL and the knock characteristic parameter are compared.

In this case, the method for performing the knock determination using the background level BGL is not limited to the above described embodiment, but other methods may be employed. For example, it may be configured that a knock determining level is set with reference to the background level BGL, and knock determination is performed by comparing the knock determining level with the signal level in the knock frequency band.

In the illustrated embodiment, the signal levels in the four frequency bands F1 to F4 are extracted from the vibration waveform signals outputted by the knock sensors 11, 12. However, the signal levels in five or more frequency bands may be extracted. Alternatively, the signal levels in two or three frequency bands may be extracted.

In the illustrated embodiment, the knock sensors 11, 12 that detect vibration of the cylinder block are used as vibration waveform detection means (or vibration waveform detection sections) for detecting knocking vibration of the engine. Instead, in-cylinder pressure sensors for detecting the in-cylinder pressures may be used. Also, an ion current detection means (or an ion current detection section) for detecting ion current produced in the cylinders, for example, through the ignition plugs may be used. Alternatively, rotation fluctuation detection means (or a rotation fluctuation detection section) for detecting rotation fluctuations of the engine based, for example, on intervals of the output pulses of the crank angle sensor may be used. In any of these cases, a vibration waveform signal corresponding to knocking vibration of the engine is outputted.

The present invention is not limited to V-type engines, but may be applied to an in-line engine or a horizontally-opposed engine. Also, the number of the cylinders is not limited to eight. That is, the present invention may be applied to engines of various numbers of cylinders. Further, the present invention may be applied to engines with or without variable valve actuation mechanism. Also, the present invention may be applied to both of in-cylinder injection engines and intake port injection engines.

The invention claimed is:

1. A knock detecting apparatus for an internal combustion engine, the apparatus comprising:
   a vibration waveform detection section that outputs a vibration waveform signal corresponding to knocking vibration of the internal combustion engine;
   a signal level extraction section that extracts the signal level of the vibration waveform signal outputted by the vibration waveform detection section for each of a plurality of frequency bands; and
   a background level detection section that detects a background level based on at least one of the signal levels in the frequency bands extracted at the signal level extraction section at a point in time when variation of the signal levels in the frequency bands is determined to be minimum or close to minimum.

2. The knock detecting apparatus according to claim 1, further comprising:
   a parameter computation section that computes a knock characteristic parameter that represents the characteristics of knock based on the signal levels in the frequency bands extracted at the signal level extraction section; and
   a knock intensity determining section that determines a knock intensity by comparing the characteristic parameter and the background level.

3. The knock detecting apparatus according to claim 1, wherein the background level detection section detects, as the background level, the mean value of the signal levels in the frequency bands extracted at the signal level extraction section at a point in time when variation of the signal levels in the frequency bands is determined to be minimum or close to minimum.

4. The knock detecting apparatus according to claim 1, wherein the background level detection section detects, as the background level, the minimum signal level among the signal levels in the frequency bands extracted at the signal level extraction section at a point in time when variation of the signal levels in the frequency bands is determined to be minimum or close to minimum.

5. The knock detecting apparatus according to claim 1, wherein the background level detection section detects, as the background level, a specific one among the signal levels in the frequency bands extracted at the signal level extraction section at a point in time when variation of the signal levels in the frequency bands is determined to be minimum or close to minimum.

6. The knock detecting apparatus according to claim 5, wherein the specific frequency band is different from frequency bands that contain the resonance frequency of knock.

7. The knock detecting apparatus according to claim 1, wherein the background level detection section detects the background level during a predetermined period set for each combustion stroke of each cylinder of the internal combustion engine.

8. The knock detecting apparatus according to claim 1, wherein the vibration waveform detection section is a knock sensor that detects vibration of a cylinder block of the internal combustion engine.

9. The knock detecting apparatus according to claim 1, wherein the vibration waveform detection section is an in-cylinder pressure sensor that detects a pressure in a cylinder of the internal combustion engine.

10. The knock detecting apparatus according to claim 1, wherein the vibration waveform detection section is an ion current detection section that detects ion current produced in a cylinder of the internal combustion engine.

11. The knock detecting apparatus according to claim 1, wherein the vibration waveform detection section is a rotation fluctuation detection section that detects rotation fluctuation of the internal combustion engine.

12. A knock detecting method for an internal combustion engine, the method comprising:
   outputting a vibration waveform signal corresponding to knocking vibration of the internal combustion engine;
   extracting the signal level of the outputted vibration waveform signal for each of a plurality of frequency bands; and
   detecting a background level based on at least one of the extracted signal levels in the frequency bands at a point in time when variation of the signal levels in the frequency bands is determined to be minimum or close to minimum.

13. The knock detecting method according to claim 12, further comprising:
   computing a knock characteristic parameter that represents the characteristics of knock based on the extracted signal levels in the frequency bands; and
   determining a knock intensity by comparing the characteristic parameter and the background level.

14. A knock detecting method for an internal combustion engine, the method comprising:
   outputting a vibration waveform signal corresponding to knocking vibration of the internal combustion engine;

extracting the signal level of the outputted vibration waveform signal for each of a plurality of frequency bands; and detecting a background level based on at least one of the extracted signal levels in the frequency bands at a crank angle position of the internal combustion engine when variation of the signal levels in the frequency bands is determined to be minimum or close to minimum.

* * * * *